United States Patent
Cropper (10) Patent No.: US 9,777,473 B2
(45) Date of Patent: Oct. 3, 2017

(54) FIRE BARRIER FOR WALL SHEATHING MATERIALS

(76) Inventor: Graig Cropper, Orem, UT (US)

( * ) Notice: Subject to any disclaimer, the term of this patent is extended or adjusted under 35 U.S.C. 154(b) by 995 days.

(21) Appl. No.: 12/556,465

(22) Filed: Sep. 9, 2009

(65) Prior Publication Data

US 2010/0058699 A1   Mar. 11, 2010

Related U.S. Application Data (60) Provisional application No. 61/095,592, filed on Sep. 9, 2008.

(51) Int. Cl.
| | | |
|---|---|---|
| *E04B 1/94* | (2006.01) | |
| *B32B 21/14* | (2006.01) | |
| *B32B 5/02* | (2006.01) | |
| *B32B 5/22* | (2006.01) | |
| *B32B 5/26* | (2006.01) | |
| *B32B 9/00* | (2006.01) | |
| *B32B 9/04* | (2006.01) | |
| *B32B 9/06* | (2006.01) | |

(Continued)

(52) U.S. Cl.
CPC ............... *E04B 1/942* (2013.01); *B32B 1/00* (2013.01); *B32B 5/02* (2013.01); *B32B 5/22* (2013.01); *B32B 5/26* (2013.01); *B32B 9/005* (2013.01); *B32B 9/04* (2013.01); *B32B 9/041* (2013.01); *B32B 9/042* (2013.01); *B32B 9/047* (2013.01); *B32B 9/06* (2013.01); *B32B 13/08* (2013.01); *B32B 13/14* (2013.01); *B32B 15/14* (2013.01); *B32B 21/02* (2013.01); *B32B 21/10* (2013.01); *B32B 21/14* (2013.01); *B32B 29/02* (2013.01); *B32B 2262/0269* (2013.01); *B32B 2262/101* (2013.01); *B32B 2262/105* (2013.01); *B32B 2262/14* (2013.01); *B32B 2307/3065* (2013.01); *B32B 2307/50* (2013.01); *B32B 2419/00* (2013.01); *B32B 2451/00* (2013.01); *B32B 2471/00* (2013.01); *B32B 2607/00* (2013.01); *B32B 2607/02* (2013.01)

(58) Field of Classification Search
CPC ......... B32B 21/06; B32B 21/14; B32B 29/02; B32B 9/04; B32B 9/047; B32B 9/06; B32B 9/005; E04B 1/942; E04B 1/941; E04B 1/94; E39B 9/042
USPC .................. 52/506.01, 783.1, 794.1, 404.1
See application file for complete search history.

(56) References Cited

U.S. PATENT DOCUMENTS

| | | | |
|---|---|---|---|
| 3,253,978 A | | 5/1966 | Bodendorf et al. |
| 3,998,018 A | * | 12/1976 | Hodges .................. 52/481.2 |

(Continued)

OTHER PUBLICATIONS

Meredith Goldstein, A wall made of doors, May 22, 2008, The Boston Globe.*

(Continued)

*Primary Examiner* — Adriana Figueroa
*Assistant Examiner* — Jessie Fonseca
(74) *Attorney, Agent, or Firm* — Pate Peterson PLLC; Brett Peterson (57) ABSTRACT

A sheathing material includes a layer of ceramic paper to help prevent the burning of the sheathing during a fire. The material may include insulation disposed between the ceramic paper and the substrate to further reduce damage to the substrate, and may include a thin layer of wood or paper placed over the ceramic paper to protect the ceramic paper and to allow the sheathing to be used in a manner similar to that of a conventional sheathing material.

12 Claims, 5 Drawing Sheets

(51) Int. Cl.
*B32B 13/08* (2006.01)
*B32B 13/14* (2006.01)
*B32B 15/14* (2006.01)
*B32B 21/02* (2006.01)
*B32B 21/10* (2006.01)
*B32B 29/02* (2006.01)
*B32B 1/00* (2006.01)

(56) References Cited

U.S. PATENT DOCUMENTS

| | | | |
|---|---|---|---|
| 4,323,620 A * | 4/1982 | Iwabuchi et al. | 428/215 |
| 4,522,673 A | 6/1985 | Fell et al. | |
| 4,650,621 A | 3/1987 | Sago et al. | |
| 4,926,963 A | 5/1990 | Snyder | |
| 5,082,494 A * | 1/1992 | Crompton | 106/18.12 |
| 5,273,821 A | 12/1993 | Olson et al. | |
| 5,603,194 A * | 2/1997 | Fridlyand et al. | 52/515 |
| 5,679,433 A | 10/1997 | Hayashi et al. | |
| 5,759,659 A | 6/1998 | Sanocki et al. | |
| 5,945,049 A | 8/1999 | Vandermeer | |
| 5,955,177 A | 9/1999 | Sanocki et al. | |
| 6,153,674 A | 11/2000 | Landin | |
| 6,247,286 B1 * | 6/2001 | Heyns | 52/589.1 |
| 6,521,834 B1 | 2/2003 | Dykhoff et al. | |
| 6,533,897 B2 | 3/2003 | Wang et al. | |
| 6,551,951 B1 | 4/2003 | Fay et al. | |
| 6,670,291 B1 * | 12/2003 | Tompkins et al. | 442/136 |
| 2003/0221372 A1 * | 12/2003 | Fortin et al. | 49/507 |
| 2009/0113831 A1 * | 5/2009 | DeWildt et al. | 52/506.01 |
| 2010/0223875 A1 * | 9/2010 | Preda | 52/506.01 |

OTHER PUBLICATIONS

O.A. Battista, Synthetic Fibers in Papermaking, ca. Aug. 26, 1976.

* cited by examiner

FIRE BARRIER FOR WALL SHEATHING MATERIALS

PRIORITY

The present application claims the benefit of U.S. Provisional Application Ser. No. 61/095,592, filed on Sep. 9, 2008, which is herein incorporated by reference in its entirety.

THE FIELD OF THE INVENTION

The present invention relates to fire barriers. More specifically, the present invention relates to improved wall sheathing materials for residential and commercial construction which include a ceramic paper fire barrier so as to improve the fire resistance of the sheathing material.

BACKGROUND

Currently, little is done to improve the fire resistance of construction materials. While some building materials such as concrete are not burned by fire, other building materials such as plywood sheathing are readily burned by fire. Some materials, such as gypsum wall board, are resistant to fire to some degree, but will typically fail rather quickly in the presence of a moderate fire. As such, fire presents a serious risk to buildings and fire damage accounts for a large portion of structural damage to buildings. In some areas, periodic forest or grass fires are common and these fires destroy many buildings. The readiness with which common building materials such as plywood burn causes the fires to spread quickly from building to building.

It would be desirable to improve the fire resistance of these common building materials without dramatically changing how the materials are used and handled. The use of more fire resistant building materials could slow or stop the progress of fires within a building or through groups of buildings, making the fire more easily controlled and reducing the damage caused by the fire. In particular, more fire resistant sheathing materials would slow or stop the spread of the fire as these would protect other building materials such as wood framing from the fire. The use of more fire resistant building materials will also slow a fire within a building, giving occupants more time to escape from such a building.

It would be desirable to make more fire resistant building materials which are used in the same manner as the conventional building material. This would allow construction workers to use the more fire resistant materials without changes to the tools which are necessary or to the methods used to build the building. This allows the more fire resistant materials to be easily adopted and used in construction projects.

There is thus a need for building materials which are more resistant to burning. There is a particular need for sheathing materials which are more resistant to burning.

SUMMARY OF THE INVENTION

It is an object of the present invention to provide an improved sheathing material with increased burn resistance.

According to one aspect of the invention, sheathing is provided which includes a layer of ceramic material therein to prevent fire from burning through the layer of ceramic. Preferably, the ceramic material is a ceramic paper.

According to another aspect of the present invention, the ceramic paper may be disposed below the surface of the sheathing material such that the use of the material is unchanged. Particularly, gypsum wall board may include a layer of ceramic paper beneath the typical paper surface of the gypsum wall board so that the ceramic paper does not change the way in which the gypsum wall board accepts plaster and paint.

These and other aspects of the present invention are realized in a sheathing material as shown and described in the following figures and related description.

BRIEF DESCRIPTION OF THE DRAWINGS

Various embodiments of the present invention are shown and described in reference to the numbered drawings wherein.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single figure, and as such, multiple figures are presented to separately illustrate the various details of the invention in greater clarity. Similarly, not every embodiment need accomplish all advantages of the present invention.

DETAILED DESCRIPTION

The invention and accompanying drawings will now be discussed in reference to the numerals provided therein so as to enable one skilled in the art to practice the present invention. The drawings and descriptions are exemplary of various aspects of the invention and are not intended to narrow the scope of the appended claims.

Figure 1:
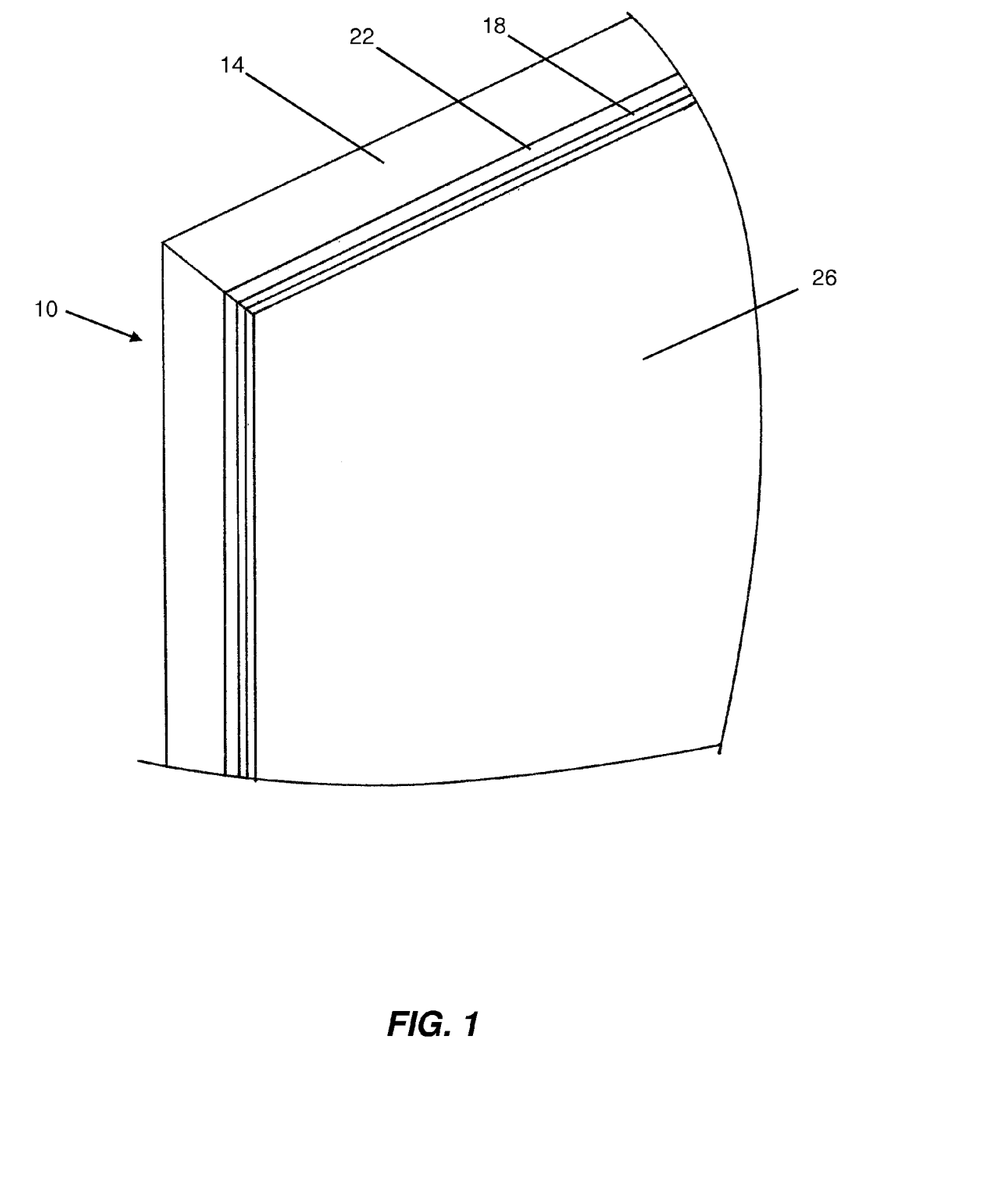
FIG. 1 shows a perspective view of a wood sheathing material according to the present invention.

Turning now to FIG. 1, a perspective view of a sheathing material according to the present invention is shown. The sheathing material 10 is a wood sheathing as is commonly used on the exterior of buildings. The sheathing material 10 includes a wood base 14 which is typically plywood, particle board, fiberboard, oriented strand board (commonly known as OSB), or the like. Plywood or OSB is commonly used as interior and exterior sheathing, as a sub-flooring material, as a roofing material, and in other similar locations in buildings. According to the present invention, a layer of ceramic, typically ceramic paper 18 is placed on the wood base 14. The ceramic paper 18 can be made as is discussed in U.S. Pat. No. 6,533,897, which is expressly incorporated herein by reference. "Paper" refers to a fibrous product produced by one of a number of paper making processes. Typically, the paper is a compressed mat-type product rather than a woven product. "Paper making process" is any process wherein the aluminosilicate refractory fibers (with or without other components) are pulped, compressed, and dehydrated. Specifically, the noncombustible fibrous papers of the present invention can comprise a dominant amount of aluminosilicate refractory fibers by weight. Typically, this will be from about 90% to 99.8% by weight. Additionally, the fibers used can be substantially from 1 micron to 35 microns in width and from 1 cm to 15 cm in length. Further, the aluminosilicate refractory fibers can comprise from 30% to 70% silica by weight and from 70% to 30% alumina by weight. However, in many instances, the silica and the alumina are present in substantially equal proportions by weight. Anywhere from about 0.2% to 4% by weight of a polymeric binder distributed throughout the paper can be used. Though not required, the paper can also include from 0.1% to 5% by weight of a textile filler. Any known textile filler can be used such as, for example, viscose fiber. Further, the noncombustible paper can also comprise from 0.2% to 5% by weight of silicic acid aquagel. For example, though any functional thickness can be prepared, from 0.3 mm to 3.0 mm of thickness is preferred. The weight can be any functional weight, though from 50 to 300 g per square meter is preferred. An example paper may have a density between 180 and 240 kg per cubic meter.

The ceramic paper 18 provides a fire barrier to protect the wood base 14 in order to inhibit or prevent burning of the wood base 14 when the same is exposed to fire. When the wood sheathing 10 is used as exterior sheathing, the wood sheathing 10 would be placed so that the ceramic paper 18 would be on the outside of the sheathing, protecting the exterior of the building from fires. In order to increase the effectiveness of the ceramic paper 18 in preventing the wood base 14 from burning, an insulation layer 22 may be placed between the ceramic paper and the wood base. The insulation layer 22 may be a more porous (less dense) ceramic layer which further inhibits heat transfer to the wood base 14. The ceramic paper has a density similar to felt papers, and serves primarily to prevent burning of an underlying material while simultaneously blocking some heat from transferring to the underlying material.

The wood sheathing 10 may also include a thin veneer 26 of paper or wood placed on top of the ceramic paper 18. The veneer 26 may serve multiple purposes. The veneer 26 may prevent damage to the ceramic paper 18 during handling and installation of the wood sheathing 10. The ceramic paper is more prone to damage than a conventional plywood or OSB, and thus may benefit from additional mechanical protection. The ceramic paper 18 may include some reinforcement to strength the ceramic paper and make the produce more durable. The reinforcement may be a fiberglass mesh, Kevlar mesh, etc. Additionally, the veneer 26 may limit the exposure of construction workers to the ceramic paper. Ceramic paper is largely comprised of ceramic fibers, which may pose health hazards similar to fiberglass. The veneer 26 may also be used to provide a surface which is more similar to conventional plywood or OSB, allowing the wood sheathing 10 to be used in much the same manner as the conventional products.

The wood sheathing 10 is thus desirable for use in any location where additional fire protection is desired. When used in floors, ceilings, roof decks, walls, etc. the sheathing 10 effectively stops or slows the pass age of the fire through the material.

Figure 2:
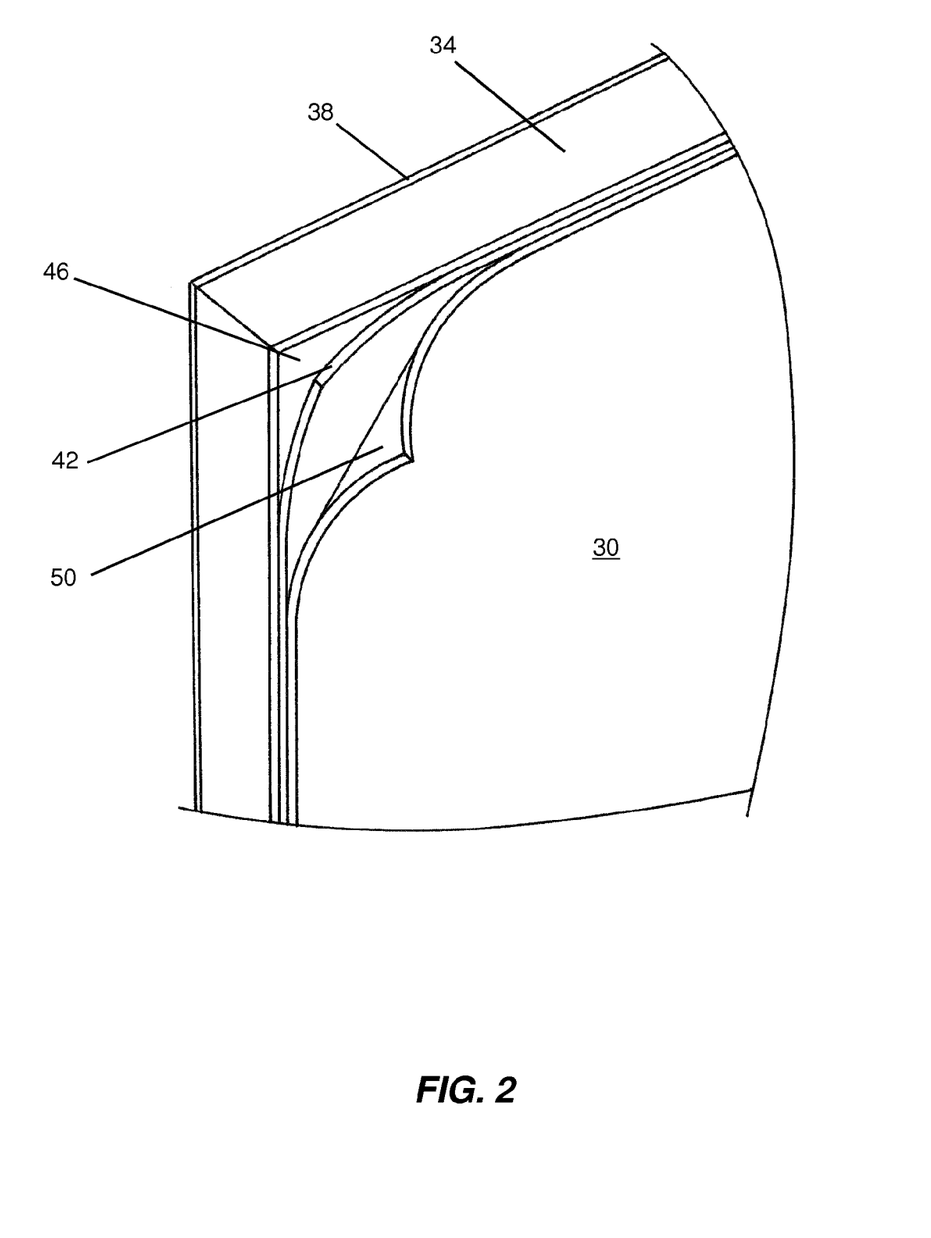
FIG. 2 shows a perspective view of a gypsum wall board sheathing material according to the present invention.

Turning now to FIG. 2, a perspective view of a piece of gypsum wall board 30 according to the present invention is shown. The gypsum wall board 30 includes a gypsum layer 34 and a paper backing layer 38 similar to conventional gypsum wall board. The gypsum wall board includes a ceramic layer which is preferably ceramic paper 42. The ceramic paper 42 protects the gypsum 34 from flame exposure and lengthens the time that the gypsum wall board 30 can resist fire. An insulation layer 46 may be placed between the ceramic paper 42 and the gypsum 34 to further protect the gypsum from fire damage. The ceramic layer 42 may include a reinforcement such as a fiberglass mesh or the like.

The gypsum wall board 30 may include a paper layer 50 placed over the ceramic paper 42. The paper layer may protect the ceramic paper 42 from damage as discussed, and make the gypsum wall board 30 respond to plaster and paint in a manner more similar to conventional gypsum wall board.

Figure 3:
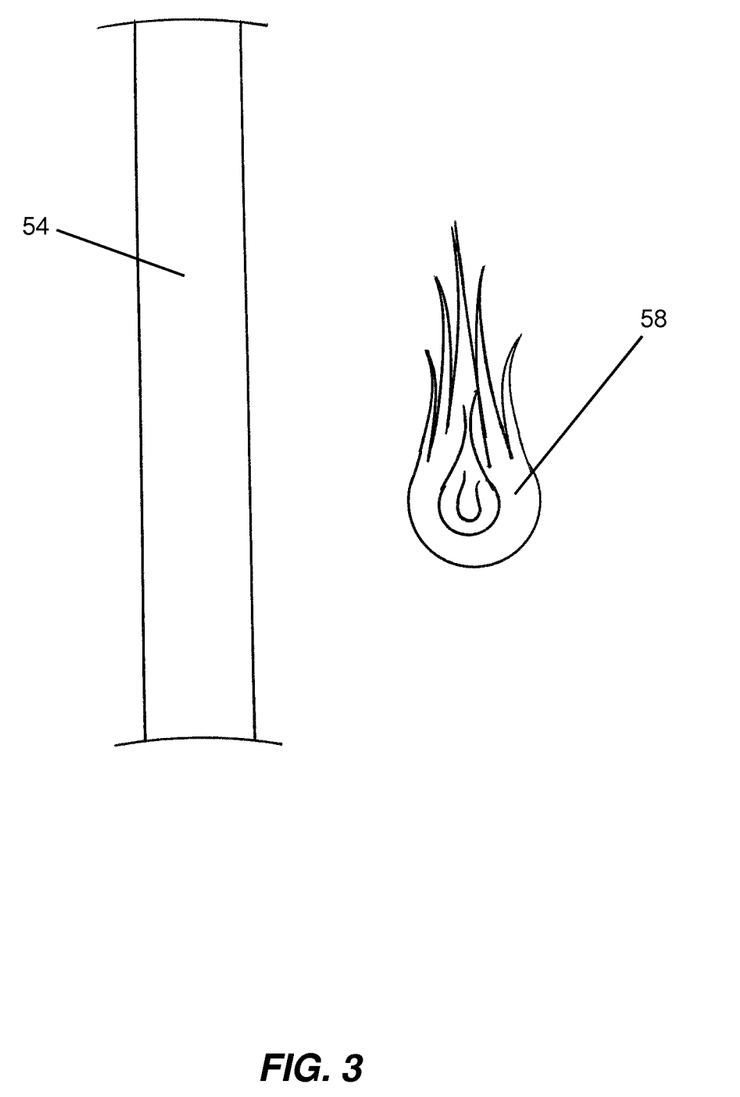
FIG. 3 shows a side view of a sheathing material according to the present invention.

Turning now to FIG. 3, a side view of a sheathing material 54 according to the present invention is shown. Sheathing material 54 may be the sheathing material 10 or the gypsum wall board 30. The sheathing material 54 is shown exposed to a fire 58. The sheathing material 54 may be a wood sheathing 10 as shown in FIG. 1 or a gypsum wall board 30 as shown in FIG. 2. Those experienced with building fires will understand that conventional gypsum wall board and wood sheathing often fail fairly quickly in a fire. Gypsum wall board tends to disintegrate in a fire and then allow the fire to burn underlying structures. Wood sheathing begins to burn. The sheathing 54 of the present invention provides increased resistance to burning. The ceramic paper layer prevents the underlying material from burning as it can withstand temperatures of 1400° C. or more without sustaining damage. Additionally, the ceramic paper inhibits the transfer of heat to the underlying material and thereby prevents or substantially slows combustion of or damage to the material.

In the case that a thin veneer or layer of paper or wood is used to cover the exposed surface of the sheathing 54, this layer would typically burn away quickly without providing an appreciable amount of fuel to the fire and leave the ceramic paper layer intact to protect the sheathing and underlying structure.

The ceramic paper layer provides protection to the underlying sheathing and building structure in many ways. By directly preventing the fire from burning the exposed sheathing the ceramic paper prevents this damage to the sheathing. While some damage to the sheathing 54 may be done by the heat, significant damage is prevented. Perhaps more importantly, however, preventing the sheathing 54 from burning deprives the fire of a fuel source. Depriving the fire of an additional fuel source reduces the intensity of the fire, keeps the fire from spreading, and allows the fire to be more easily contained and extinguished. It will thus be appreciated that while application of the present invention to a single building will help prevent damage to that building, application of the present invention to many buildings in an area may significantly reduce the damage caused by a fire as it deprives the fire of fuel and makes the fire more easily contained and extinguished.

Figure 4:
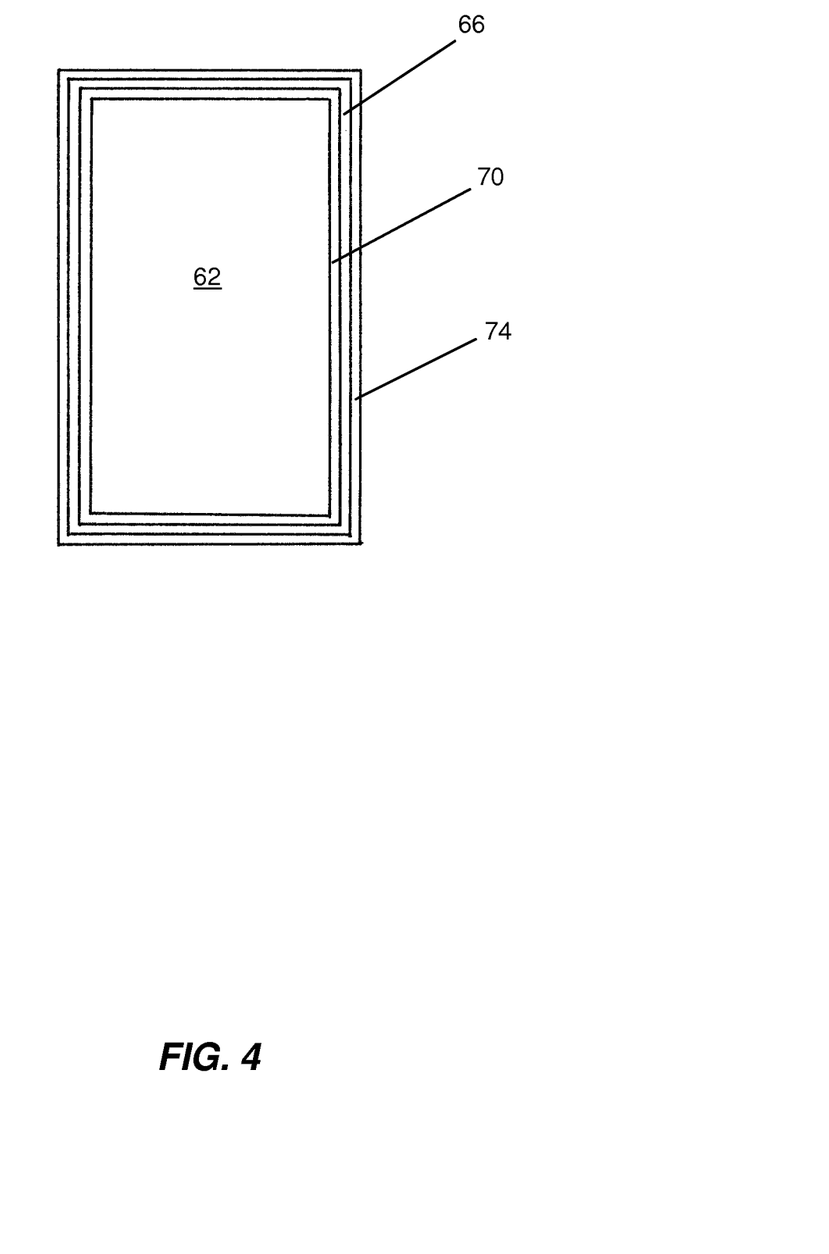
FIG. 4 shows a cross sectional view of a beam according to the present invention.

Turning now to FIG. 4, a cross sectional view of a beam 62 having a fire barrier according to the present invention is shown. The beam 62 is often a wood beam, though steel beams and other beams also benefit from the fire protection shown. The beam 62 includes a layer of ceramic paper 66 which provides a fire barrier to protect the beam 62 in order to inhibit or prevent burning of or damage to the beam 62 when the same is exposed to fire. In order to increase the effectiveness of the ceramic paper 66 in preventing the beam 62 from burning, an insulation layer 70 may be placed between the ceramic paper and the beam. The insulation layer 70 may be a more porous (less dense) ceramic layer which further inhibits heat transfer to the beam 62. The ceramic paper has a density similar to felt papers, and serves primarily to prevent burning of an underlying material while simultaneously blocking some heat from transferring to the underlying material.

The beam 62 may also include a thin veneer 74 of paper, wood, or other materials placed on top of the ceramic paper 66. The veneer 74 may serve multiple purposes. The veneer 74 may prevent damage to the ceramic paper 66 during handling and installation of the beam 62. The ceramic paper is more prone to damage than conventional materials such as wood, and thus may benefit from additional mechanical protection. The ceramic paper 66 may include some reinforcement to strength the ceramic paper and make the produce more durable. The reinforcement may be a fiberglass mesh, Kevlar mesh, etc. Additionally, the veneer 74 may limit the exposure of construction workers to the ceramic paper. Ceramic paper is largely comprised of ceramic fibers, which may pose health hazards similar to fiberglass. The veneer 74 may also be used to provide a surface which is more similar to a conventional beam, allowing the beam 62 to be used in much the same manner as conventional beams. The beam 62 would provide fire benefits as discussed with respect to FIG. 3. In many situations, buildings have beams which may not be adequately protected from fire by enclosing the beam within a sheathing material as discussed herein, or which merit additional fire protection even if enclosed by the fire resistant sheathing materials of the present invention. These are often key structural beams, and increasing the fire resistance of these beams may significantly decrease the likelihood that a fire causes collapse of the building. Beams 62 may thus be used in order to increase the fire resistance of the building.

Figure 5:
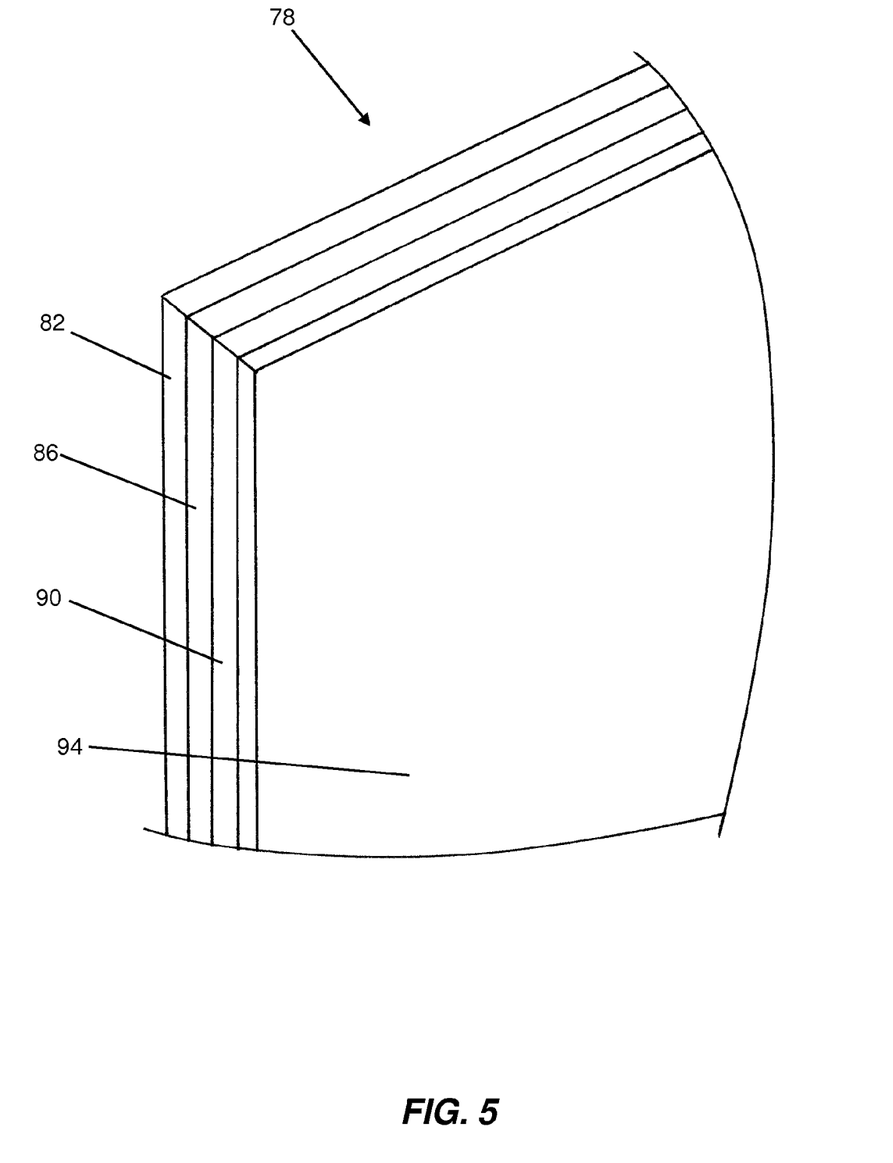
FIG. 5 shows a perspective view of a wall paper according to the present invention.

Turning now to FIG. 5, a side view of a wall paper 78 having a fire barrier according to the present invention is shown. The wall paper 78 typically includes an exterior face 82 which may be a decorative and finished face as is known with conventional wall papers, or which may be a surface configured for accepting paint. A ceramic paper layer 86 is provided which provides a fire barrier. An insulation layer 90, which may be a lower density ceramic paper, may be provided to decrease the heat transfer to the structure to which the wall paper 78 is applied. An adhesive layer 94 may be provided, or conventional wall paper adhesive may be used to apply the wall paper 78 to a wall, ceiling, or other building surface.

The wall paper 78 is applied to partially or completely finished building walls and ceilings to increase the fire resistance of the wall. Thus, the wall paper 78 may often be applied to kitchen walls or garage walls as these walls are more likely to experience a fire. The wall paper 78 provides a fire barrier which prevents or substantially hinders a fire from penetrating through the wall, limiting the spread of the fire and damage to the building.

The wall paper may be applied to existing buildings in a manner similar to conventional wall paper, and may even have a decorative surface. This allows many persons to improve the fire resistance of their building without any more work than is common for redecorating the building.

The present invention provides particular benefits where it is desirable to isolate areas of a building and provide fire protection between these areas. In many cases it is desirable to create a stronger fire barrier between areas of a building. Such a fire wall may be desirable in storage units, condominium complexes, high rise buildings, office complexes, etc. In these situations, it is often desirable to provide increased fire protection between adjacent tenants or areas to prevent the spread of fire and limit the risk that a problem caused by one tenant adversely affects another tenant. Similarly, it may be desirable to isolate particular rooms such as storage rooms from the rest of an area or to isolate sections of a building such as different floors of the building. In these situations, one or more of the building materials discussed herein may be used to create a fire barrier. The sheathing of FIG. 1, the gypsum wall board of FIG. 2, the beams of FIG. 4, or the wall paper of FIG. 5 may be used alone or in combination to create a fire barrier between sections of a building that is highly resistant to fire and thus protects adjacent areas of a building from a potential fire.

There is thus disclosed an improved fire resistant sheathing material for buildings. It will be appreciated that numerous changes may be made to the present invention without departing from the scope of the claims.

What is claimed is:

1. A preformed construction sheathing material comprising:
  a generally planar and continuous wood sheet having a length and a width and having a first side and a second side and a thickness disposed between the first side and the second side; and
  a layer of ceramic fiber material affixed directly to the first side of the wood sheet to cover substantially all of the first side thereof wherein the layer of ceramic fiber material forms a first exterior surface of the sheathing material;
  wherein substantially all of the second side of the wood sheet is exposed and forms a second exterior surface of the sheathing material opposite the first exterior surface of the sheathing material;
  wherein the sheathing material is attached to a building as exterior wall sheathing, interior wall sheathing, ceiling sheathing, sub-flooring, or roof decking such that the second side of the wood sheet is attached to the building, such that the first side of the wood sheet faces away from the surface of the building to which the second side of the wood sheet is attached, and such that the wood sheet is disposed between the layer of ceramic fiber material and the building such that the layer of ceramic fiber material is exposed and covers the wood sheet.

2. The sheathing material of claim 1, wherein the wood sheet is selected from the group consisting of plywood, particle board, fiberboard, and OSB.

3. The sheathing material of claim 1, wherein the ceramic fiber material is a ceramic paper which has a thickness which is between about 0.3 millimeters and 3 millimeters.

4. A preformed sheet material for use in construction comprising:
  a generally planar sheet of material having a length and a width and having a first side and a second side and a thickness between the first side and the second side, the sheet of material being selected from the group consisting of wood, plywood, particle board, fiberboard, and OSB; and
  a layer of ceramic fiber material having a first face and a second face, wherein the first face is attached directly to the first side of the generally planar sheet of material such that the ceramic fiber material covers substantially all of the first side of the sheet of material; and
  wherein substantially all of the second side of the generally planar sheet of material is exposed and forms a first exterior surface of the sheet material;
  wherein the second face of the layer of ceramic fiber material is exposed and forms a second exterior surface of the sheet material which is opposite the first exterior surface of the sheet material.

5. The preformed sheet material of claim 4, wherein the sheet material is attached to a building as exterior wall sheathing, interior wall sheathing, ceiling sheathing, sub-flooring, or roof decking such that the first side of the generally planar sheet of material is oriented away from the building and the second side of the generally planar sheet of material is attached to the building and the generally planar sheet of material is disposed between the layer of ceramic fiber material and the building such that the layer of ceramic fiber material covers the generally planer sheet of material.

6. The preformed sheet material of claim 4, wherein the layer of ceramic fiber material is a ceramic paper having a weight between about 50 and 300 grams per square meter.

7. The preformed sheet material of claim 4, wherein the preformed sheet material is attached to a building as exterior wall sheathing, interior wall sheathing, ceiling sheathing, sub-flooring, or roof decking such that the second side of the sheet of material is attached to the building and the sheet of material is disposed between the layer of ceramic fiber material and the building.

8. A preformed sheet material for use in construction comprising:
   a generally planar wood sheet defining a substrate having a length and a width, a first side and an opposed second side, and a thickness between the length and the width;
   a thin layer of ceramic fiber fire barrier sheet material which has a first side and a second side, wherein the first side of the layer of ceramic fiber fire barrier material is directly attached to the first side of the wood sheet to cover substantially all of the first side of the wood sheet;
   an outer veneer attached to the second side of the layer of ceramic fiber fire barrier material to cover substantially all of the layer of ceramic fiber fire barrier material, wherein the veneer is thin;
   wherein substantially all of the second side of the wood sheet is exposed and forms a first exterior surface of the preformed sheet material;
   wherein the veneer forms a second exterior surface of the preformed sheet material disposed opposite the first exterior surface of the preformed sheet material; and
   wherein the preformed sheet material is attached to a building as exterior wall sheathing, interior wall sheathing, ceiling sheathing, sub-flooring, or roof decking.

9. The preformed sheet material of claim 8, wherein the layer of ceramic fiber fire barrier material is a ceramic paper having a thickness between about 0.3 millimeters and 3 millimeters.

10. The preformed sheet material of claim 8, wherein the wood sheet is selected from the group consisting of plywood, particle board, fiberboard, and OSB.

11. The preformed sheet material of claim 10, wherein the layer of ceramic fiber fire barrier material is a ceramic paper having a thickness between about 0.3 millimeters and 3 millimeters.

12. The preformed sheet material of claim 8, wherein the outer veneer is formed from a material selected from the group consisting of wood and paper.

\* \* \* \* \*